United States Patent [19]

Harrison

[11] Patent Number: 4,649,618

[45] Date of Patent: Mar. 17, 1987

[54] METHOD FOR REMOVING OIL SEALS

[76] Inventor: Scott A. Harrison, 18 Holland St., Fall River, Mass. 02720

[21] Appl. No.: 850,282

[22] Filed: Apr. 10, 1986

Related U.S. Application Data

[63] Continuation-in-part of Ser. No. 554,829, Nov. 21, 1983, abandoned.

[51] Int. Cl.[4] .......... B23P 19/04

[52] U.S. Cl. .......... 29/426.5; 29/235; 29/267

[58] Field of Search .......... 29/235, 267, 270, 278, 29/426.1, 426.5, 426.6

[56] References Cited

U.S. PATENT DOCUMENTS

| | | | |
|---|---|---|---|
| 597,286 | 1/1898 | Horswill, Jr. | 81/3.46 A |
| 748,953 | 1/1904 | Jacobs | 29/235 X |
| 1,826,740 | 10/1931 | Courtney | 81/3.46 A |
| 1,892,824 | 1/1933 | Ziegler | 29/267 X |
| 2,915,927 | 12/1959 | De Genova | 29/235 |
| 3,145,463 | 8/1964 | Hockett | 29/235 X |
| 3,610,076 | 10/1971 | Martens | 81/3.46 A |
| 4,240,192 | 12/1980 | Davis | 29/426.6 |

FOREIGN PATENT DOCUMENTS

| | | | |
|---|---|---|---|
| 231984 | 12/1960 | Australia | 254/28 |

*Primary Examiner*—Frederick R. Schmidt
*Assistant Examiner*—Steven P. Schad
*Attorney, Agent, or Firm*—Salter & Michaelson

[57] ABSTRACT

A method for removing an oil seal and the like from a housing is disclosed, wherein the seal is of the type which is received in the housing for providing a sealed relation between the housing and a shaft which projects outwardly through the seal. The method is preferably carried out utilizing a tool which comprises a shank portion, and a working portion of generally S-shaped configuration which extends from the shank portion, the working portion comprising an upper portion and a lower portion which terminates in a tapered pry point. The tool is operable for removing a seal in accordance with the method by inserting the pry point between the seal and the shaft and then moving the tool so that the lower portion of the working portion rolls on the shaft to extract the seal. Thereafter, if necessary, the tool can be rolled further on the shaft until the upper portion engages the end of the shaft to provide additional leverage for extracting the seal.

8 Claims, 5 Drawing Figures

METHOD FOR REMOVING OIL SEALS

BACKGROUND AND SUMMARY OF THE INVENTION

This application is a continuation-in -part of Ser. No. 554, 829 filed Nov. 21, 1983 (now abandoned) and entitled "Tool for Removing Oil Seals".

The instant invention relates to the removal of oil seals and more particularly to a novel method for removing an oil seal from a housing, wherein the seal is of the type used for providing a sealed relation between the housing and a rotatable shaft which projects outwardly from the housing.

Oil seals are used in a wide variety of applications for sealing between housings and rotatable shafts where the shafts extend outwardly from their respective housings. In most situations of this type, an oil seal is sealingly received in a recess in a housing, and a shaft extends through a central aperture in the seal and outwardly therefrom. A seal used in this type of application generally comprises a metallic inner reinforcing core and a rubberized outer body which encases the inner core. The rubberized body effectively provides a sealed oil-tight relation between the seal and the housing and also between the seal and the shaft, even during rotation of the shaft. Normally, however, the shaft must be highly polished in the portion thereof which passes through the seal in order to prevent damage to the seal during rotation of the shaft which would permit oil to leak through the seal. Oil seals are widely used in applications of this type in automotive and motorcycle constructions. For example, seals of this type have been widely used in motorcycle constructions for sealing stator shafts, crankshafts, shift spindles, and countershafts as they pass through respective housings.

Heretofore, the removal of a worn and/or defective oil seal for the replacement thereof has presented a significant problem. In many cases, the replacement of an oil seal has required the dismantling of a housing and the draining of oil therefrom in order to gain access to the seal. This operation has frequently proven to be time consuming and costly and has also necessitated the replacement of gaskets, oil, etc., in addition to the seal.

The instant invention provides a novel method which substantially simplifies the procedure for removing an oil seal and the like from a housing. More specifically, the method of the instant invention can be utilized for effectively removing or extracting an oil seal from a housing for the replacement thereof without dismantling the housing and, in many cases, without draining the oil from the housing. Once the original seal has been removed from the housing, it can easily be replaced with a new seal with a minimum of difficulty. Accordingly, the entire operation of replacing the oil seal can be effectively simplified, and both labor and material costs can be substantially reduced. The tool which is utilized in the method of the instant invention preferably comprises an elongated rod having a substantially straight shank portion and a workng portion which extends integrally from the shank portion, terminating in a tapered pry point. The working portion is of generally S-shaped configuration and it preferably comprises an upper portion which extends arcuately outward and back relative to the longitudinal axis of the working portion and a lower portion which extends from the upper portion arcuately outwardly and back relative to the axis of the working portion in substantially the opposite direction from the upper portion. The lower portion terminates in a tapered pry point which faces slightly outwardly relative to the axis of the working portion. The tool is operable by inserting the pry point between a shaft and a seal and thereafter moving the shank portion so that the outer surface of the lower portion of the working portion rolls on the outer surface of the shaft to remove the seal. In some cases it is also necessary to further move the tool unil the inner surface of the upper portion of the working portion bears on the terminal end of the shaft. This allows the terminal end of the shaft to be utilized as a fulcrum so that the seal can be pried from its position in the housing. Further, in the preferred embodiment of the tool, the outer surface of the lower portion and the inner surface of the upper portion are configured so that the tendency for lateral slippage of the tool on the shaft is reduced, whereby the lower portion can be rolled against the shaft and whereby sufficient leverage can be applied with the tool to remove the seal easily. In this connection, preferably the tool is constructed in a rectangular cross section so that the outer surface of the lower portion and the inner surface of the upper portion are substantially flat to provide reduced lateral slippage, although other surface configurations for the lower and upper portions which provide reduced lateral slippage are contemplated.

Devices and methods which represent the closest prior art to the instant invention of which the applicant is aware are disclosed in the U.S. patents to Horswill, Jr., U.S. Pat. No. 597,286; Jacobs, U.S. Pat. No. 748,953; Rund U.S. Pat. No. 1,013,067; Courtey, U.S. Pat. No. 1,826,740; Ziegler et al, U.S. Pat. No. 1,892,824; Bishop U.S. Pat. No. 2,471,557; Van Allen U.S. Pat. No. 3,162,475; Martens, U.S. Pat. No. 3,610,076; and Bushinsky U.S. Pat. No. 3,861,248, and the Australian patent to Murchison, U.S. Pat. No. 321,984. However, none of these references teach a method of removing an oil seal utilizing a device that is formed with an arcuate or curved lower portion which rolls on the outer surface of a shaft and an arcuate or curved upper portion which bears on the terminal end of a shaft to provide leverage to remove an oil seal, and hence these references are believed to be of nothing more than general interest.

Accordingly, it is a primary object of the instant invention to provude an effective method for removing an oil seal from a housing without dismantling the housing.

A still further object of the instant invention is to provide an effective method of removing an oil seal which is operable without damaging a shaft which extends through the seal.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
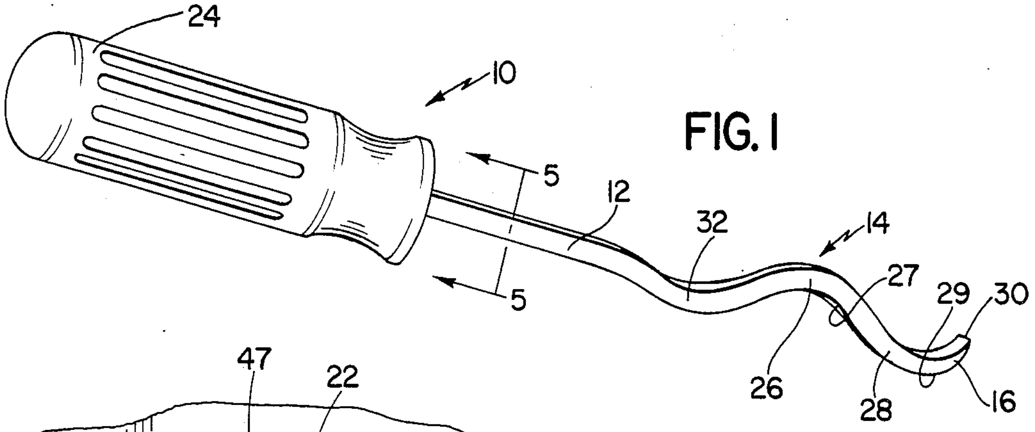
FIG. 1 is a perspective view of the oil seal removing tool which is utilized in the method of the instant invention.
Figure 2:
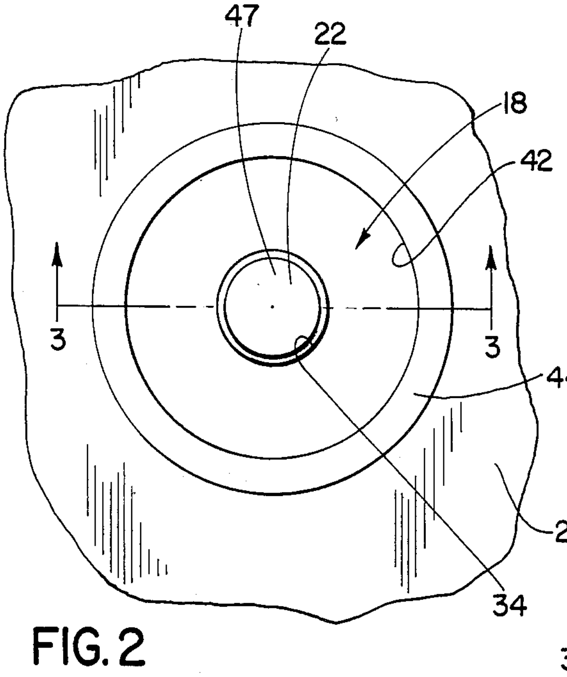
FIG. 2 is a top plan view of an oil seal received in a housing, the seal having a shaft extending therethrough.

Referring now to the drawing, the tool for removing oil seals and the like which is preferably utilized in the method of the instant invention is illustrated in FIGS. 1, 3, 4 and 5 and generally indicated at 10 in FIG. 1. The tool 10 comprises an elongated rod having a substantially straight shank portion 12, and a working portion generally indicated at 14 which extends from the shank portion 12 terminating in a tapered pry point 16. The tool 10 is operative for removing an oil seal of the type generally indicated at 18 in FIGS. 2, 3 and 4 from a housing 20 in an application wherein a rotatable shaft 22 extends through the seal 18 and projects outwardly a short distance therefrom. More specifically, the tool 10 is operative by inserting the pry point 16 between the shaft 22 and the oil seal 18 and by thereafter moving the shank portion 12 so that the tool 10 engages the shaft 22 to provide the necessary leverage to effect the extraction of the seal 18 in the manner illustrated in FIGS. 3 and 4 which will hereinafter be more fully described.

Figure 5:
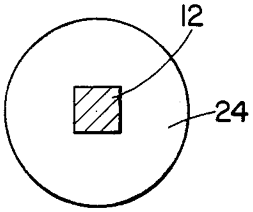
FIG. 5 is a sectional view taken along line 5—5 i FIG 1.

Referring now to FIGS. 1 and 5, the shank portion 12 of the elongated rod is substantially straight, preferably has a substantially rectangular or square cross section, and is preferably constructed of a suitable rigid metal. A handle 24 is received on one end of the shank portion 12 for facilitating the use and operation of the tool 10, the working portion 14 extending integrally from the opposite end of the shank portion 12. The working portion 14 has a generally S-shaped configuration and is preferably of generally square or rectangular cross section. The working portion 14 comprises an upper portion 26 which extends arcuately outwardly and back relative to the longitudinal axis of the working portion 12, and which is formed with a flat inner surface 27. A lower portion 28 extends from the upper portion 26 arcuately outwardly and back relative to the axis of the working portion 12 in substantially the opposite direction from the upper portion 26 and it is formed with a flat outer surface 29. It should be pointed out that as a result of the sectional configuration of the working portion 14, the inner surface 27 and the outer surface 29 are substantially flat in transverse directions relative to the working portion 14. They are, however, obviously arcuate in their longitudinal extents as a result of the overall configurations of the upper and lower portions 26 and 28, respectively. The lower portion 28 terminates in the tapered pry point 16 which faces slightly outwardly relative to the axis of the working portion 12. As will be noted from FIG. 1, the tapered configuration of the pry point 16 preferably results primarily from a gradual reduction in the thickness of the lower portion 28 at the terminal end thereof rather than an overall reduction in the sectional dimension thereof or a reduction in the width thereof so that the width of the pry point 16, at the terminal end thereof, is substantially greater than the thickness thereof. Accordingly, a transverse probing edge 30 is defined at the terminal end of the pry point 16, the edge 30 extending in substantially perpendicular relation to the directions of outward curvature of the upper and lower portions 26 and 28, respectively. In the tool 10 as herein embodied, the working portion 14 further comprises a transition portion 32 which integrally interconnects the upper end of the upper portion 26 to the shank portion 12, and extends arcuately outwardly and back relative to the axis of the working portion 12 in substantially the reverse direction with respect to the upper portion 26. The transition portion 32 provides a smooth and effective transition between the upper portion 26 and the shank portion 12. However, the outward curvature of this portion is not absolutely essential to the operation of the tool 10, and hence other embodiments of the tool 10 which do not include the transition portion 32, such as providing for the extension of the upper portion 26 integrally from the shank portion 12, or which include transition portions of other configurations, are contemplated. Further, some forms of the method can be carried out with a tool which does not include the upper portion 26 but only the lower portion 28.

The tool 10 is operative for removing or extracting the seal 18 from the housing 20. In this regard, the seal 18 is preferably of substantially circular configuration, having a central aperture 34 therethrough. The seal 18 preferably comprises a rubberized outer body 36 having a metallic inner core 38 therein, and a resilient retaining ring 40 which biases the inner portion of the body portion 36 towards the aperture 34. The seal 18 is received in a recess 42 which is defined by a boss 44 in the housing 20, the boss 44 having an inner seat 46 on which the seal 18 is normally received. The shaft 22 extends through the aperture 34 in the seal 18 and projects outwardly threrfrom a short distance, terminating in a free terminal end 44. In use and operation of the seal 18, it provides an effective oil seal between the housing 20 and the rotatable shaft 22 whereby the outward flow of oil from the housiing 20 along the shaft 22 is prevented, even during rotation of the shaft 22.

Figure 3:
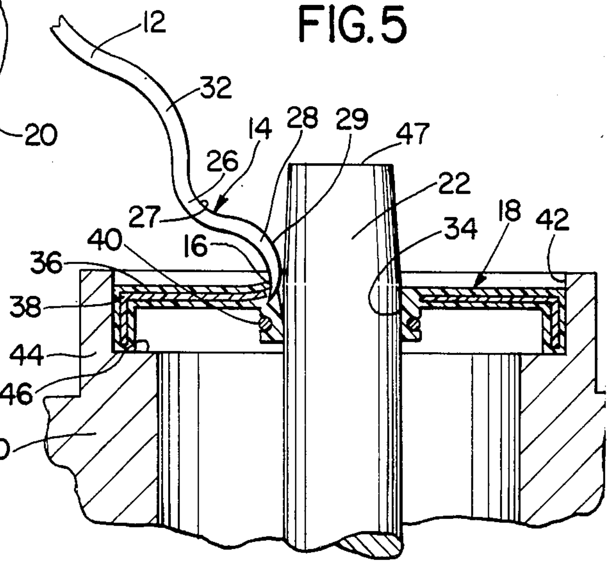
FIG. 3 is a sectional view taken along line 3—3 in FIG. 2 with the tool of the invention inserted between the seal and the shaft.
Figure 4:
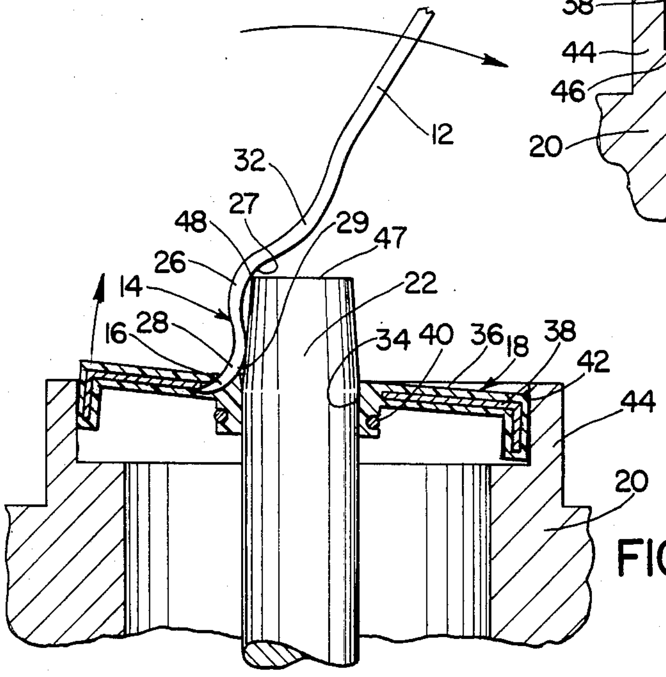
FIG. 4 is a similar view illustrating the removal of the seal with the tool in accordance with the method.

The use and operation of the tool 10 is illustrated in FIGS. 3 and 4. As will be seen, initially the pry point 16 is inserted in the aperture 34 between the seal 18 and the shaft 22 in the manner illustrated in FIG. 3. Thereafter, the tool is moved so that the shank portion 12 is drawn generally toward the shaft 22 so that the outer surface 29 of the lower portion 28 "rolls" on the outer surface of the shaft 22 to provide leverage for removing the seal 18. In some instances this operation alone is sufficient to remove the seal 18. In other cases, however, it is preferable to further move the tool 10 until the inner surface 27 of the upper portion 26 engages the terminal end 44 as at 48 in the manner illustrated in FIG. 4. Thereafter, the tool 10 is moved so that the inner surface of the upper portion 26 bears on the terminal end 44 to provide a pivoting action, whereby the pry point 16 is urged outwardly from the shaft and upwardly to extract the seal 18 from the recess 42. The "flat" configurations of the surfaces 29 and 27 reduce the tendencies for lateral slippage of the tool 10 on the shaft 22 during these operations, facilitating the "rolling" of the lower portion 28 and thereafter the pivoting of the upper portion 26. However, the embodiment of the tool with other surface configurations, such as concave, etc., to achieve reduced lateral slippage, is also contemplated. In any case, it should be brought out that during the entire operation of extracting the seal 18, normally only the outer surface 29 of the lower portion 28 and sometimes the inner surface 27 of the upper portion 26 actually engage the shaft 22, and therefore the shaft is not contacted by sharp edges or by the pry point 16 so that scratching or marring of the surface of the shaft 22 is avoided. Accordingly, the seal 18 can be replaced with a new seal without disassembling the housing 20 and normally without removing the shaft 22 from the housing 20 for machining or polishing thereof.

It is seen, therefore, that the instant invention provides an effective method for removing oil seals and the like from housings. The tool 10 is operative in a simple and efficient manner in accordance with the method for removing an oil seal without causing damage to a shaft and without requiring disassembly of a housing in which the seal is received. Hence the method of the instant invention represents a substantial savings in labor costs by substantially simplifying the procedures required for the replacement of oil seals. Accordingly, for these reasons as well as the other reasons hereinabove set forth, it is seen that the method of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of removing an oil seal from a housing, wherein the seal is received in a recess in the housing for providing a sealed relation between the housing and a rotatable shaft which projects outwardly a short distance from the seal comprising inserting a pry point of a tool between said seal and said shaft, said tool comprising an elongated rod having a lower working portion which extends arcuately outwardly and back relative to the longitudinal axis of said rod terminating in said pry point, said tool being inserted so that the outer surface of said lower working portion faces said shaft, and rolling the outer surface of said lower working portion on said shaft to extract said seal.

2. In the method of claim 1, the outer surface of said lower working portion being configured for reduced lateral slippage of said tool when said lower working portion surface is bearing on said shaft.

3. In the method of claim 2, the outer surface of said lower working portion being substantially flat in a transverse direction.

4. In the method of claim 1, said tool further characterized as having an upper working portion which extends arcuately and back relative to the longitudinal axis of said rod from the upper end of said lower working portion in substantially the opposite direction as said lower working portion, said rolling step further characterized as rolling the outer surface of said lower working portion on said shaft until the inner surface of said upper working portion engages the terminal end of said shaft, said method further comprising thereafter rolling the inner surface of said upper working portion on the terminal end of said shaft to extract said seal.

5. In the method of claim 4, the outer surface of said lower working portion being configured for reduced lateral slippage of said tool when said lower working portion outer surface is bearing on said shaft.

6. In the method of claim 5, said lower working portion being substantially flat in a transverse direction.

7. In the method of claim 5, the inner surface of said upper working portion being configured for reduced lateral slippage of said tool on said shaft terminal end.

8. In the method of claim 7, the inner surface of said upper working portion being substantially flat in a transverse direction.

* * * * *